(12) United States Patent
Mo et al.

(10) Patent No.: US 8,917,355 B1
(45) Date of Patent: Dec. 23, 2014

(54) VIDEO STITCHING SYSTEM AND METHOD

(71) Applicant: Google Inc., Mountain View, CA (US)

(72) Inventors: Vincent Mo, Sunnyvale, CA (US);
David Cohen, Mountain View, CA (US);
Aravind Krishnaswamy, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/013,723

(22) Filed: Aug. 29, 2013

(51) Int. Cl.
*H04N 9/475* (2006.01)
*H04N 5/92* (2006.01)

(52) U.S. Cl.
CPC .................... *H04N 5/9205* (2013.01)
USPC ............. 348/512; 348/518; 348/38; 348/564; 348/588

(58) Field of Classification Search
USPC ......... 348/512, 518, 563, 565, 511, 159, 564, 348/588, 383, 36, 38; 345/629
See application file for complete search history.

(56) References Cited

U.S. PATENT DOCUMENTS

| | | | |
|---|---|---|---|
| 8,228,372 B2 | 7/2012 | Griffin | |
| 2010/0183280 A1 | 7/2010 | Beauregard et al. | |
| 2010/0265313 A1 | 10/2010 | Liu et al. | |
| 2010/0278509 A1* | 11/2010 | Nagano et al. ................ | 386/230 |
| 2010/0296571 A1 | 11/2010 | El-Saban et al. | |
| 2013/0141523 A1 | 6/2013 | Banta et al. | |

* cited by examiner

*Primary Examiner* — Michael Lee

(57) ABSTRACT

A method and computing system for receiving a first video file containing a first plurality of video frames. A second video file containing a second plurality of video frames is received. The video files are processed to identify at least one non-graphical temporal alignment object included in each of the video files. The video files are temporally aligned using the at least one non-graphical temporal alignment object to produce temporally-aligned video files.

19 Claims, 9 Drawing Sheets

ﬁles are temporally aligned using the at least one non-graphical temporal alignment object to produce temporally-aligned video ﬁles.

VIDEO STITCHING SYSTEM AND METHOD

TECHNICAL FIELD

This disclosure relates to video ﬁles and, more particularly, to the combining of multiple video ﬁles to form a consolidated output ﬁle.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs. Another use of the internet is to allow for the posting and exchanging of photos & videos via e.g., various social websites/networks.

Oftentimes, the ﬁeld of view of a particular video capture device (e.g., such as a smart phone) may be limited. Accordingly, when generating videos of objects that have a wide ﬁeld of view (e.g., sporting events, nature panoramas), a single video capture device may not be able to capture the entire image absent excessive and repeated panning of the video capture device, even though it may have been more desirable to capture the entire object in a single non-panning video.

SUMMARY OF DISCLOSURE

In one implementation, a computer-implemented method includes receiving a ﬁrst video ﬁle containing a ﬁrst plurality of video frames. A second video ﬁle containing a second plurality of video frames is received. The video ﬁles are processed to identify at least one non-graphical temporal alignment object included in each of the video ﬁles, wherein the at least one non-graphical temporal alignment object includes one or more of a timestamp included in each of the video ﬁles and an audio alignment object included in each of the video ﬁles. The video ﬁles are temporally aligned using the at least one non-graphical temporal alignment object to produce temporally-aligned video ﬁles. The temporally-aligned video ﬁles are combined to generate a consolidated output ﬁle having one or more of a higher resolution and a longer duration than each of the video ﬁles. Combining the video ﬁles to generate a consolidated output ﬁle includes one or more of: combining one or more of the ﬁrst plurality of video frames included within the ﬁrst video ﬁle and one or more of the second plurality of video frames included within the second video ﬁle to generate one or more higher resolution video frames for inclusion within the consolidated output ﬁle; and appending at least a portion of the second video ﬁle to at least a portion of the ﬁrst video ﬁle to generate the consolidated output ﬁle having a longer duration than each of the video ﬁles.

In another implementation, a computer-implemented method includes receiving a ﬁrst video ﬁle containing a ﬁrst plurality of video frames. A second video ﬁle containing a second plurality of video frames is received. The video ﬁles are processed to identify at least one non-graphical temporal alignment object included in each of the video ﬁles. The video ﬁles are temporally aligned using the at least one non-graphical temporal alignment object to produce temporally-aligned video ﬁles.

One or more of the following features may be included. The at least one non-graphical temporal alignment object may include a timestamp included in each of the video ﬁles. The at least one non-graphical temporal alignment object may include an audio alignment object included in each of the video ﬁles. Processing the video ﬁles to identify at least one non-graphical temporal alignment object may include ﬁltering the video ﬁles to remove audio noise and identify the audio alignment object. The temporally-aligned video ﬁles may be combined to generate a consolidated output ﬁle having one or more of a higher resolution and a longer duration than each of the video ﬁles. Combining the temporally-aligned video ﬁles to generate a consolidated output ﬁle may include combining one or more of the ﬁrst plurality of video frames included within the ﬁrst video ﬁle and one or more of the second plurality of video frames included within the second video ﬁle to generate one or more higher resolution video frames for inclusion within the consolidated output ﬁle. Combining the temporally-aligned video ﬁles to generate a consolidated output ﬁle may include appending at least a portion of the second video ﬁle to at least a portion of the ﬁrst video ﬁle to generate the consolidated output ﬁle having a longer duration than each of the video ﬁles.

One or more additional video ﬁles containing one or more pluralities of video frames may be received. Processing the video ﬁles to identify at least one non-graphical temporal alignment object included in each of the video ﬁles may include processing the ﬁrst video ﬁle, the second video ﬁle, and the one or more additional video ﬁles to identify at least one non-graphical temporal alignment object included in each of the video ﬁles. Temporally aligning the video ﬁles using the at least one non-graphical temporal alignment object may include temporally aligning the ﬁrst video ﬁle, the second video ﬁle, and the one or more additional video ﬁles using the at least one non-graphical temporal alignment object included in each of the video ﬁles.

In another implementation, a computing system including a processor and memory is conﬁgured to perform operations including receiving a ﬁrst video ﬁle containing a ﬁrst plurality of video frames. A second video ﬁle containing a second plurality of video frames is received. The video ﬁles are processed to identify at least one non-graphical temporal alignment object included in each of the video ﬁles. The video ﬁles are temporally aligned using the at least one non-graphical temporal alignment object to produce temporally-aligned video ﬁles.

One or more of the following features may be included. The at least one non-graphical temporal alignment object may include a timestamp included in each of the video ﬁles. The at least one non-graphical temporal alignment object may include an audio alignment object included in each of the video ﬁles. Processing the video ﬁles to identify at least one non-graphical temporal alignment object may include ﬁltering the video ﬁles to remove audio noise and identify the audio alignment object. The temporally-aligned video ﬁles may be combined to generate a consolidated output ﬁle having one or more of a higher resolution and a longer duration than each of the video ﬁles. Combining the temporally-aligned video ﬁles to generate a consolidated output ﬁle may include combining one or more of the ﬁrst plurality of video frames included within the ﬁrst video ﬁle and one or more of the second plurality of video frames included within the second video ﬁle to generate one or more higher resolution video frames for inclusion within the consolidated output ﬁle. Combining the temporally-aligned video files to generate a consolidated output file may include appending at least a portion of the second video file to at least a portion of the first video file to generate the consolidated output file having a longer duration than each of the video files.

One or more additional video files containing one or more pluralities of video frames may be received. Processing the video files to identify at least one non-graphical temporal alignment object included in each of the video files may include processing the first video file, the second video file, and the one or more additional video files to identify at least one non-graphical temporal alignment object included in each of the video files. Temporally aligning the video files using the at least one non-graphical temporal alignment object may include temporally aligning the first video file, the second video file, and the one or more additional video files using the at least one non-graphical temporal alignment object included in each of the video files.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Introduction

Figure 1:
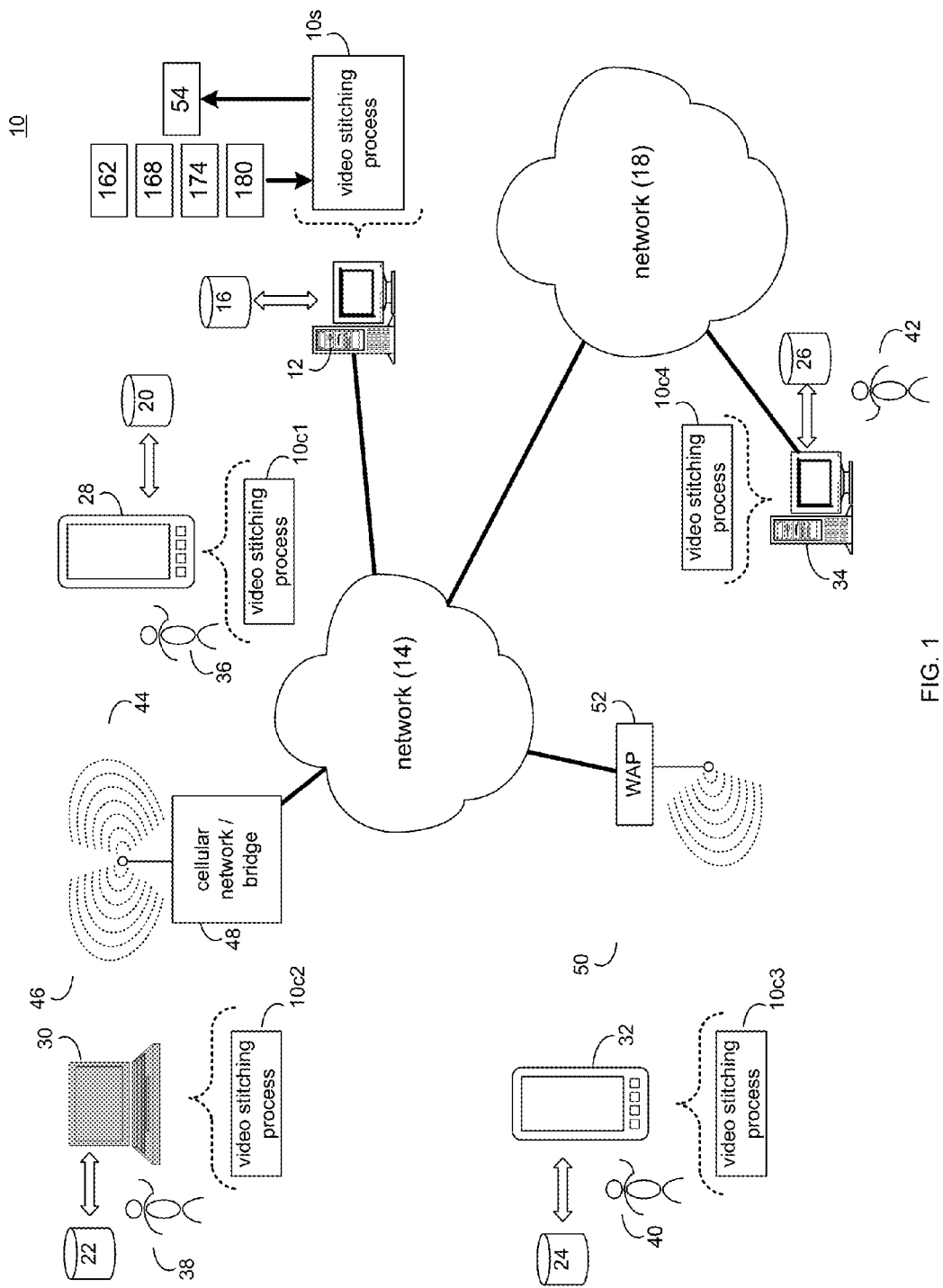
FIG. 1 is a diagrammatic view of a distributed computing network including a computing device that executes a video stitching process according to an implementation of the present disclosure.
Figure 2:
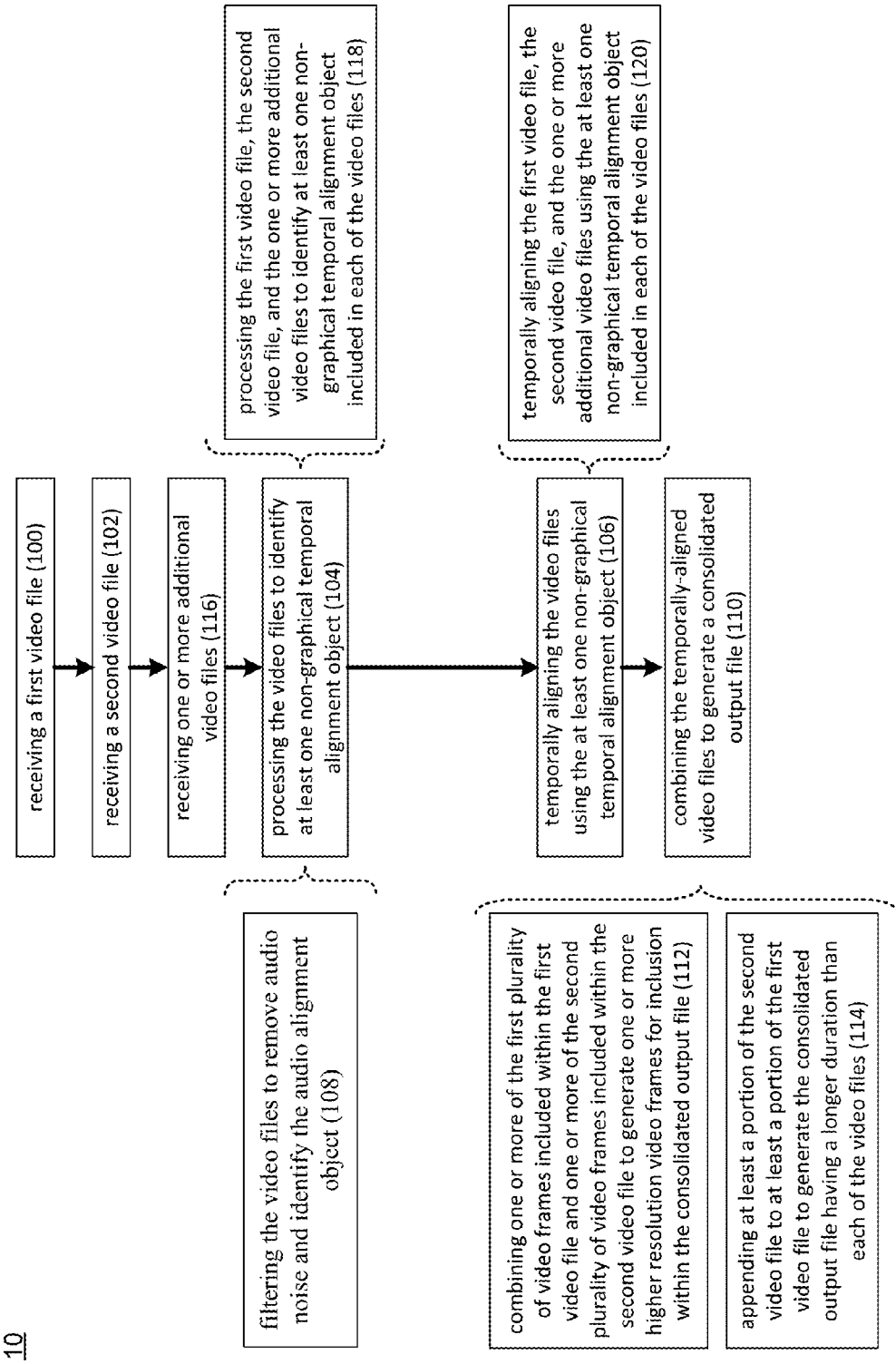
FIG. 2 is a flowchart of the video stitching process of FIG. 1 according to an implementation of the present disclosure.

In FIGS. 1 & 2, there is shown video stitching process 10. Video stitching process 10 may be implemented as a server-side process, a client-side process, or a hybrid server-side/client-side process. For example, video stitching process 10 may be implemented as a purely server-side process via video stitching process 10s. Alternatively, video stitching process 10 may be implemented as a purely client-side process via one or more of video stitching process 10c1, video stitching process 10c2, video stitching process 10c3, and video stitching process 10c4. Alternatively still, video stitching process 10 may be implemented as a hybrid server-side/client-side process via video stitching process 10s in combination with one or more of video stitching process 10c1, video stitching process 10c2, video stitching process 10c3, and video stitching process 10c4. Accordingly, video stitching process 10 as used in this disclosure may include any combination of video stitching process 10s, video stitching process 10c1, video stitching process 10c2, video stitching process 10c3, and video stitching process 10c4.

As will be discussed below in greater detail, video stitching process 10 may receive 100 a first video file containing a first plurality of video frames. A second video file containing a second plurality of video frames may be received 102. The video files may be processed 104 to identify at least one non-graphical temporal alignment object included in each of the video files. The video files may be temporally aligned 106 using the at least one non-graphical temporal alignment object to produce temporally-aligned video files.

Video stitching process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of video stitching process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of video stitching processes 10c1, 10c2, 10c3, 10c4 may include but are not limited to a web browser, a web browser plug-in or applet, a game console user interface, a video conference user interface, or a specialized application (e.g., an application running on e.g., the Android™ platform or the iOS· platform). The instruction sets and subroutines of video stitching processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Video Stitching Process

Figure 3:
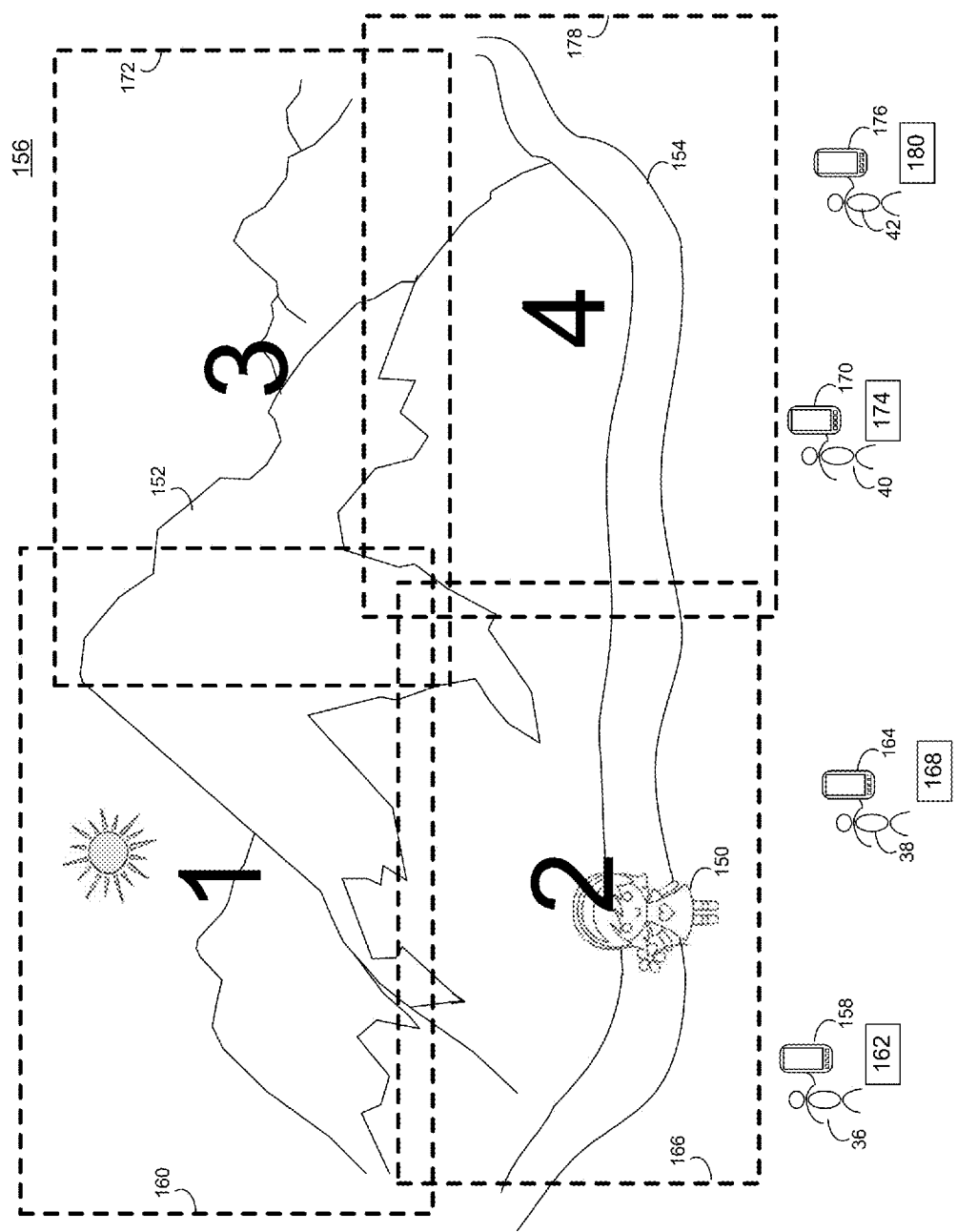
FIG. 3 is a diagrammatic view of a scene being recorded using four video capture devices according to an implementation of the present disclosure.

Referring also to FIG. 3, assume for illustrative purposes that user 36, 38, 40, 42 are all coworkers and all of them are on a business trip together. Further, assume that user 36 brought their child (e.g. child 150) with them. Assume that during some downtime on this business trip, users 36, 38, 40, 42 visited a national park and came upon a observation point overlooking mountain range 152 and stream 154 (collectively referred to as scene 156).

Further, assume that user 36 would like to have child 150 stand by stream 154 so that a video may be made of child 150 framed by mountain range 152 and stream 154. Unfortunately, since the field of view of mountain range 152 and stream 154 is so vast, any video taken that prominently features child 150 will not be able to also capture the vast majority of mountain range 152 and stream 154. However, through the use of video stitching process 10, multiple video capture devices (e.g. video cameras, cell phones, smart phones, DSLRs) may capture multiple videos of scene 156, which may subsequently be synchronized and combined into consolidated output file 54, which may have a higher resolution and/or a longer duration than the video files from which consolidated output file 54 was constructed.

Continuing with the above-stated example, assume that: user 36 uses smart phone 158 to capture first portion 160 of scene 156, resulting in the generation of first video file 162; user 38 uses smart phone 164 to capture second portion 166 of scene 156, resulting in the generation of second video file 168; user 40 uses smart phone 170 to capture third portion 172 of scene 156, resulting in the generation of third video file 174; and user 42 uses smart phone 176 to capture fourth portion 178 of scene 156, resulting in the generation of fourth video file 180.

Once the capture of video files 162, 168, 174, 180 is complete, these video files may be provided to video stitching process 10. If video files 162, 168, 174, 180 are comparatively small in size and smart phones 158, 164, 170, 176 have Internet connectivity, video files 162, 168, 174, 180 may be wirelessly transmitted to video stitching process 10. Alternatively, if video files 162, 168, 174, 180 are considerably large and/or smart phones 158, 164, 170, 176 do not have Internet connectivity, smart phones 158, 164, 170, 176 may need to be physically connected to e.g. network 14 and/or network 18 prior to being able to provide video files 162, 168, 174, 180 to video stitching process 10.

Figure 4:
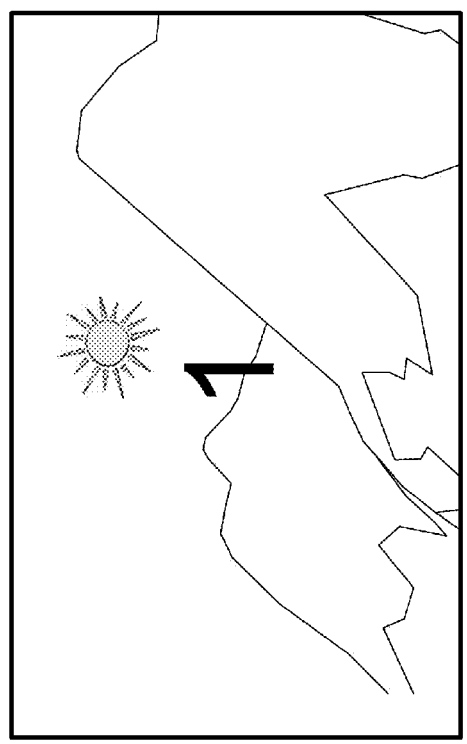
FIG. 4 is a diagrammatic view of a first portion of the scene of FIG. 4 according to an implementation of the present disclosure.
Figure 5:
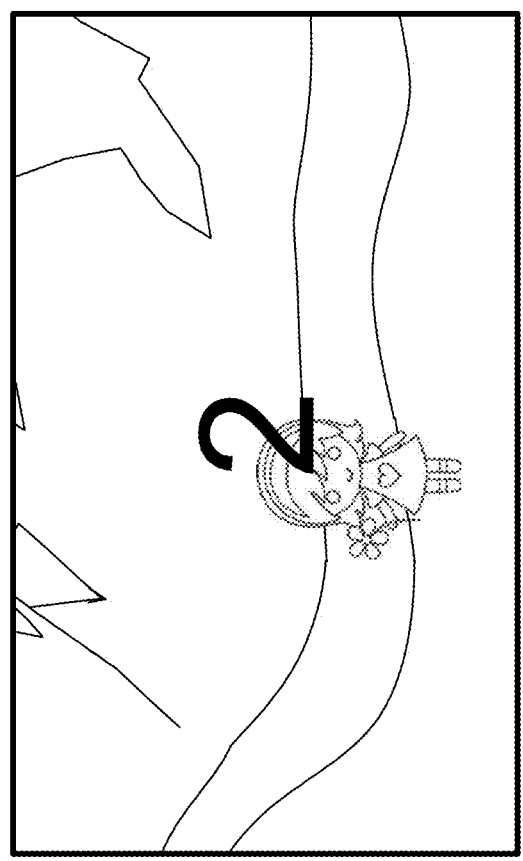
FIG. 5 is a diagrammatic view of a second portion of the scene of FIG. 4 according to an implementation of the present disclosure.
Figure 6:
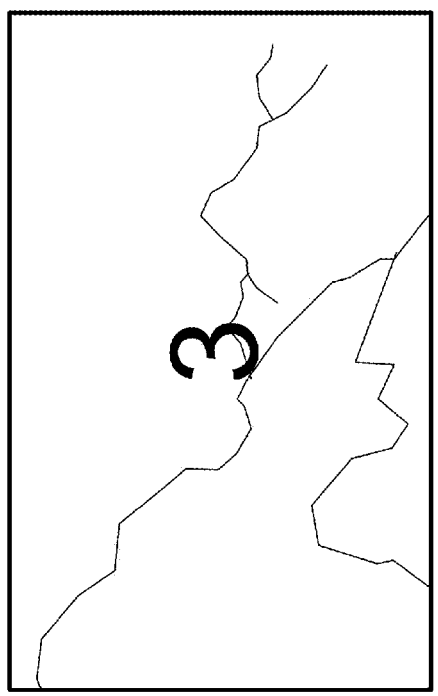
FIG. 6 is a diagrammatic view of a third portion of the scene of FIG. 4 according to an implementation of the present disclosure.
Figure 7:
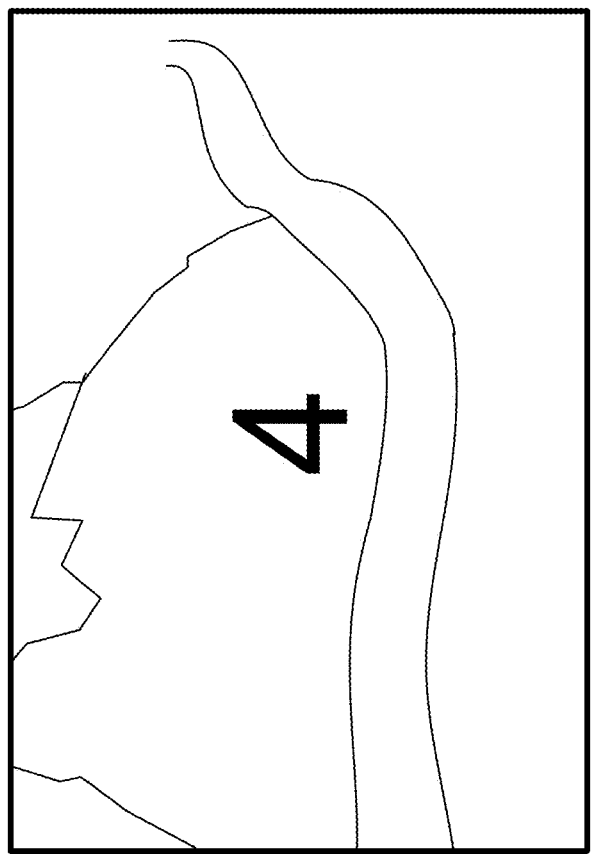
FIG. 7 is a diagrammatic view of a fourth portion of the scene of FIG. 4 according to an implementation of the present disclosure.

For this particular example, assume that video file 162 is a recording of a first portion (i.e. the upper left-hand quadrant) of scene 156 (as shown in FIG. 4); video file 168 is a recording of a second portion (i.e. the lower left-hand quadrant) of scene 156 (as shown in FIG. 5); video file 174 is a recording of a third portion (i.e. the upper right-hand quadrant) of scene 156 (as shown in FIG. 6); and video file 180 is a recording of a fourth portion (i.e. the lower right-hand quadrant) of scene 156 (as shown in FIG. 7).

Assume as a first example (and for illustrative purposes only) that user 36 wishes to combine two video files (namely video file 162 and video file 168) to generate consolidated output file 54. Accordingly and continuing with the above-stated example, assume that (via wireless or wired connectivity) smart phones 158, 164 provide video files 162, 168 to video stitching process 10.

Video stitching process 10 may receive 100 a first video file (e.g., video file 162) containing a first plurality of video frames and may receive 102 a second video file (e.g., video file 168) containing a second plurality of video frames. As is known, video files (e.g., video files 162, 168) are essentially a sequence of temporally-spaced discrete video frames that, when rendered sequentially appear to the human eye as motion video.

Video stitching process 10 may process 104 the video files (e.g., video files 162, 168) to identify at least one non-graphical temporal alignment object included in each of the video files. Examples of such non-graphical temporal alignment objects may include but are not limited to a timestamp included in each of video files 162, 168 and/or an audio alignment object included in each of video files 162, 168.

For example, assume that user 36 began recording video file 162 slightly before user 38 began recording video file 168. Accordingly, if video stitching process 10 attempted to temporally align video file 162 and video file 168 by simply aligning the beginning of each video file, video files 162, 168 may be misaligned and, therefore, could not be properly combined.

Accordingly, by processing 104 video files 162, 168 to identify one or more non-graphical temporal alignment objects included within the video files, more accurate temporal alignment of video files 162, 168 may be achieved by video stitching process 10.

Figure 8:
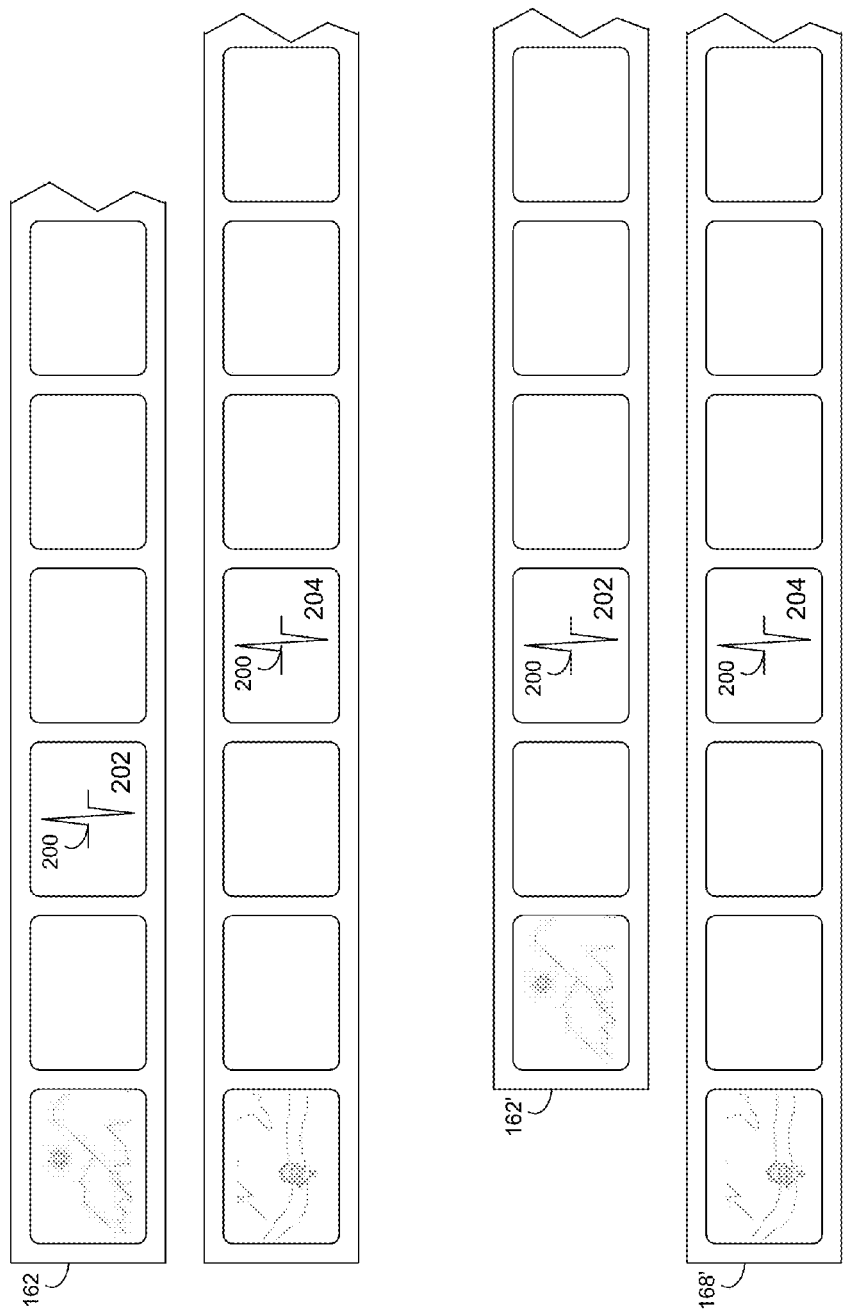
FIG. 8 is a diagrammatic view of individual video frames includes within the video files of the scene of FIG. 4 according to an implementation of the present disclosure.
Figure 9:
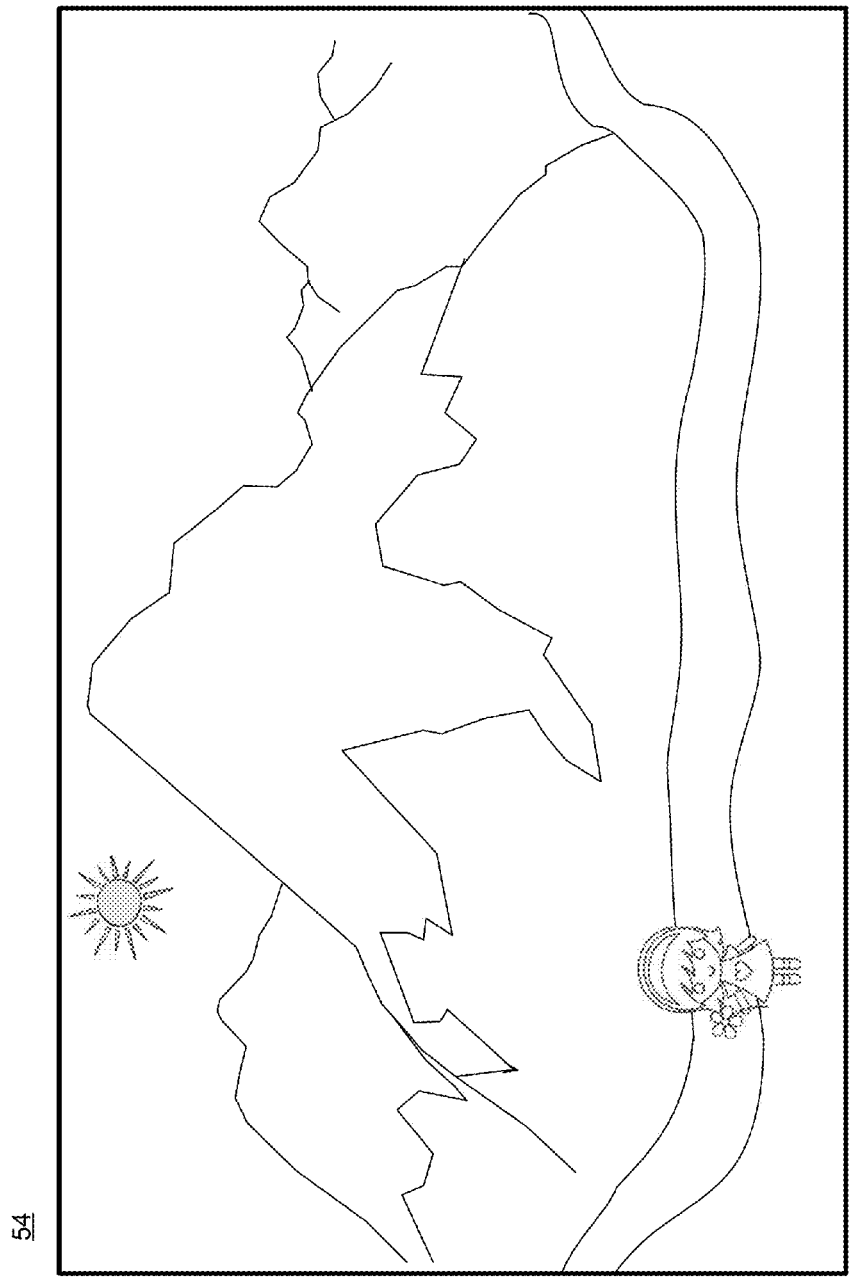
FIG. 9 is a diagrammatic view of a consolidated output file of the scene of FIG. 4 captured by the video stitching process of FIG. 1.

Referring also to FIG. 8, once video stitching process 10 processes 104 video files 162, 168 and identifies one or more non-graphical temporal alignment objects, video stitching process 10 may temporally align 106 video files 162, 168 using the non-graphical temporal alignment object(s) to produce temporally-aligned video files 162', 168'. For example, assume that shortly after beginning to record video files 162, 168, a car horn was honked, resulting in the generation of a loud sound (e.g., sound 200; an audio alignment object). As shown in FIG. 8, sound 200 occurred during third video frame 202 of video file 162, yet occurred during fourth video frame 204 of video file 168 (thus illustrating temporal misalignment).

Accordingly, video stitching process 10 may temporally align 106 video files 162, 168 by time shifting video file 162 one frame to the right, so that the non-graphical temporal alignment object (namely sound 200) that occurs within video frames 202, 204 of video files 162, 168 may be temporally aligned 106, resulting in the generation of temporally-aligned video files 162', 168'.

When video stitching process 10 processes 104 video files 162, 168 to identify one or more non-graphical temporal alignment objects, video stitching process 10 may filter 108 video files 162, 168 to remove low-level audio noise, thus allowing for easier identification of audio alignment objects (e.g., sound 200). For example, video stitching process 10 may filter 108 video files 162, 168 to remove all audio signals below a certain decibel level, thus allows for easier identification of higher decibel sounds (which may be used as audio alignment objects).

While the above-described example discusses temporally aligning 106 video files 162, 168 using an audio alignment object (e.g., sound 200), other configurations are possible and are considered to be within the scope of this disclosure. For example and as discussed above, if video files 162, 168 include time stamps, video stitching process 10 may temporally align 106 such time stamps (included within video files 162, 168) to produce temporally-aligned video files 162', 168'.

Once temporally aligned 106, video stitching process 10 may combine 110 temporally-aligned video files 162', 168' to generate e.g., consolidated output file 54. As discussed above and as will be discussed below, consolidated output file 54 may have a higher resolution and/or a longer duration than each of video files 162, 168 (the files from which it was made). In this particular example, consolidated output file 54 may have a higher vertical resolution than either of video files 162, 168, as video files 162, 168 may be vertically stacked to produce consolidated output file 54.

When combining 110 temporally-aligned video files 162', 168' to generate consolidated output file 54, video stitching process 10 may combine 112 one or more of the video frames included within first video file 162/162' and one or more of the video frames included within second video file 168/168' to generate one or more higher resolution video frames for inclusion within consolidated output file 54.

Referring again to FIGS. 4-5, there is shown first portion 160 (i.e. the upper left-hand quadrant) of scene 156 (FIG. 4) and second portion 166 (i.e. the lower left-hand quadrant) of scene 156 (FIG. 5). As shown in FIG. 3, the lower edge of first portion 160 overlaps the upper edge of second portion 166. Accordingly, video stitching process 10 may combine 112 video frames included within first portion 160 of scene 156 (included within video file 162) with video frames included within second portion 166 of scene 156 (included within video file 168) to generate higher resolution video frames for inclusion within consolidated output file 54, wherein such higher resolution frames may have (in this example) a taller aspect ratio and include a higher vertical pixel count.

When combining 112 video frames within temporally-aligned video files 162', 168', various techniques may be employed by video stitching process 10, example of which may include but are not limited to:

SIFT Techniques: Video stitching process 10 may use a Scale-Invariant-Feature-Transform to detect local features included within temporally-aligned video files 162', 168', thus allowing such features to be extracted so that they may be used to describe the individual video frames included within temporally-aligned video files 162', 168'. The detected features included within each video frame may be compared to determine which (if any) portions of the video frames included within temporally-aligned video files 162', 168' match.

Energy Maps: Video stitching process 10 may use energy maps that may provide a high level indication of the number of edges included within each video frame of temporally-aligned video files 162', 168', wherein video stitching process 10 may construct an energy map for each video frame included within temporally-aligned video files 162', 168'. Video stitching process 10 may perform a block-based analysis for each video frame to determine the edge energy for each block (e.g., 10×10 pixel blocks or 15×15 pixel blocks), wherein these edge energy calculations may be compared to determine which (if any) portions of the video frames included within temporally-aligned video files 162', 168' match.

Feature Detection: Video stitching process 10 may use various feature detection processes to determine which (if any) portions of the video frames included within temporally-aligned video files 162', 168' match. An example of such a feature detection process may include but is not limited to face detection. For example, if the face of child 150 appeared in both first portion 160 of scene 156 and second portion 166 of scene 156 (which it does not in this example), the face of child 150 may be used as a feature to align video frames included within temporally-aligned video files 162', 168'.

In the event that user 36 and/or user 38 moves smart phone 158 and/or smart phone 164 while recording temporally-aligned video files 162, 168, gaps may appear between temporally-aligned video files 162', 168' in the event that portions of temporally-aligned video files 162', 168' no longer overlap. In the event that there are such gaps, video stitching process 10 may fill is such gaps with monochromatic pixels or may patch such gaps with pixels that chromatically match the pixels that are proximate the gaps.

In the event that temporally-aligned video files 162', 168' were recorded using different frame rates (e.g., 30 frames per second vs. 24 frames per second), video stitching process 10 may e.g., down convert the higher frame rate video file to the frame rate of the lower frame rate video file prior to being combined 110 to generate consolidated output file 54.

While video stitching process 10 is described above as combining 112 video frames to generate higher resolution video frames for inclusion within consolidated output file 54, this is for illustrative purposes only and is not intended to be a limitation of this disclosure, as other configurations are possible and are considered to be within the scope of this disclosure. For example, when combining 110 temporally-aligned video files 162', 168' to generate consolidated output file 54, video stitching process 10 may append 114 at least a portion of second video file 168/168' to at least a portion of first video file 162/162' to generate consolidated output file 54, which may have a longer duration than each of video files 162/162', 168/168'.

For example, assume that first video file 162/162' is three minutes long and second video file 168/168' is five minutes long, wherein the last one minute of first video file 162/162' overlaps with the first one minute of second video file 168/168'. Accordingly, video stitching process 10 may append 114 the last four minutes of second video file 168/168' to the end of first video file 162/162' to generate consolidated output file 54, which may have a duration of seven minutes (which is longer than each of video files 162/162', 168/168').

While video stitching process 10 is described above as combining two video files (namely temporally-aligned video files 162', 168'), this is for illustrative purposes only and is not intended to be a limitation of this disclosure, as other configurations are possible.

Accordingly and continuing with the above-stated example, assume that (via wireless or wired connectivity) smart phones 170, 176 provides video files 174, 180 to video stitching process 10. As discussed above, third video file 174 is a recording of a third portion (i.e. the upper right-hand quadrant) of scene 156 (as shown in FIG. 6) and fourth video file 180 is a recording of a fourth portion (i.e. the lower right-hand quadrant) of scene 156 (as shown in FIG. 7). Video stitching process 10 may receive these additional video files (e.g., video files 174, 180), each of which may contain a plurality of video frames.

In such a situation, when processing 104 the video files, video stitching process 10 may process 118 the first video file (e.g., video file 162), the second video file (e.g., video file 168), and the additional video files (e.g., video files 174, 180) to identify at least one non-graphical temporal alignment object (as described above) that is included within video files 162, 168, 174, 180 (in the manner described above). Further, when temporally aligning 106 the video files using this non-graphical temporal alignment object, video stitching process 10 may temporally align 120 the first video file (e.g., video file 162), the second video file (e.g., video file 168), and the one or more additional video files (e.g., video file 174, 180) using this non-graphical temporal alignment object included within video files 162, 168, 174, 180 (in the manner described above), thus resulting in the generation of consolidated output file 54 (as shown in FIG. 8).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving a first video file containing a first plurality of video frames;
receiving a second video file containing a second plurality of video frames;
processing the video files to identify at least one non-graphical temporal alignment object included in each of the video files, wherein the at least one non-graphical temporal alignment object includes one or more of a timestamp included in each of the video files and an audio alignment object included in each of the video files;
temporally aligning the video files using the at least one non-graphical temporal alignment object to produce temporally-aligned video files; and
combining the temporally-aligned video files to generate a consolidated output file having one or more of a higher resolution and a longer duration than each of the video files, wherein combining the video files to generate a consolidated output file includes one or more of:
combining one or more of the first plurality of video frames included within the first video file and one or more of the second plurality of video frames included within the second video file to generate one or more higher resolution video frames for inclusion within the consolidated output file, and
appending at least a portion of the second video file to at least a portion of the first video file to generate the consolidated output file having a longer duration than each of the video files.

2. A computer-implemented method comprising:
receiving a first video file containing a first plurality of video frames;
receiving a second video file containing a second plurality of video frames;
processing the video files to identify at least one non-graphical temporal alignment object included in each of the video files;
temporally aligning the video files using the at least one non-graphical temporal alignment object to produce temporally-aligned video files; and
combining the temporally-aligned video files to generate a consolidated output file having one or more of a higher resolution and a longer duration than each of the video files.

3. The computer-implemented method of claim 2 wherein the at least one non-graphical temporal alignment object includes a timestamp included in each of the video files.

4. The computer-implemented method of claim 2 wherein the at least one non-graphical temporal alignment object includes an audio alignment object included in each of the video files.

5. The computer-implemented method of claim 4 wherein processing the video files to identify at least one non-graphical temporal alignment object includes:
filtering the video files to remove audio noise and identify the audio alignment object.

6. The computer-implemented method of claim 2 wherein combining the temporally-aligned video files to generate a consolidated output file includes:
combining one or more of the first plurality of video frames included within the first video file and one or more of the second plurality of video frames included within the second video file to generate one or more higher resolution video frames for inclusion within the consolidated output file.

7. The computer-implemented method of claim 2 wherein combining the temporally-aligned video files to generate a consolidated output file includes:
appending at least a portion of the second video file to at least a portion of the first video file to generate the consolidated output file having a longer duration than each of the video files.

8. The computer-implemented method of claim 2 further comprising:
receiving one or more additional video files containing one or more pluralities of video frames.

9. The computer-implemented method of claim 8 wherein processing the video files to identify at least one non-graphical temporal alignment object included in each of the video files includes:
processing the first video file, the second video file, and the one or more additional video files to identify at least one non-graphical temporal alignment object included in each of the video files.

10. The computer-implemented method of claim 8 wherein temporally aligning the video files using the at least one non-graphical temporal alignment object includes:
temporally aligning the first video file, the second video file, and the one or more additional video files using the at least one non-graphical temporal alignment object included in each of the video files.

11. A computing system including a processor and memory configured to perform operations comprising:
- receiving a first video file containing a first plurality of video frames;
- receiving a second video file containing a second plurality of video frames;
- processing the video files to identify at least one non-graphical temporal alignment object included in each of the video files;
- temporally aligning the video files using the at least one non-graphical temporal alignment object to produce temporally-aligned video files; and
- combining the temporally-aligned video files to generate a consolidated output file having one or more of a higher resolution and a longer duration than each of the video files.

12. The computing system of claim 11 wherein the at least one non-graphical temporal alignment object includes an audio alignment object included in each of the video files.

13. The computing system of claim 12 wherein processing the video files to identify at least one non-graphical temporal alignment object includes:
- filtering the video files to remove audio noise and identify the audio alignment object.

14. The computing system of claim 11 wherein the at least one non-graphical temporal alignment object includes a timestamp included in each of the video files.

15. The computing system of claim 11 wherein combining the temporally-aligned video files to generate a consolidated output file includes:
- combining one or more of the first plurality of video frames included within the first video file and one or more of the second plurality of video frames included within the second video file to generate one or more higher resolution video frames for inclusion within the consolidated output file.

16. The computing system of claim 11 wherein combining the temporally-aligned video files to generate a consolidated output file includes:
- appending at least a portion of the second video file to at least a portion of the first video file to generate the consolidated output file having a longer duration than each of the video files.

17. The computing system of claim 11 further configured to perform operations comprising:
- receiving one or more additional video files containing one or more pluralities of video frames.

18. The computing system of claim 17 wherein processing the video files to identify at least one non-graphical temporal alignment object included in each of the video files includes:
- processing the first video file, the second video file, and the one or more additional video files to identify at least one non-graphical temporal alignment object included in each of the video files.

19. The computing system of claim 17 wherein temporally aligning the video files using the at least one non-graphical temporal alignment object includes:
- temporally aligning the first video file, the second video file, and the one or more additional video files using the at least one non-graphical temporal alignment object included in each of the video files.

* * * * *